United States Patent [19]

Johnson

[11] 4,301,398

[45] Nov. 17, 1981

[54] METHOD AND APPARATUS FOR CONTROLLING A RESONANT POWER MODULE

[75] Inventor: Robert W. Johnson, Levittown, Pa.

[73] Assignee: Exide Electronics Corporation, Philadelphia, Pa.

[21] Appl. No.: 154,503

[22] Filed: May 29, 1980

[51] Int. Cl.$^3$ .................... H02J 7/10; H02M 3/315
[52] U.S. Cl. ........................... 320/21; 320/39; 320/59; 363/28; 363/57
[58] Field of Search ............... 307/149, 150; 320/21–24, 39, 40, 57, 59; 363/28, 57, 135

[56] References Cited

U.S. PATENT DOCUMENTS

| | | | |
|---|---|---|---|
| 3,736,480 | 5/1973 | Lee | 320/59 X |
| 3,873,846 | 3/1975 | Morio et al. | 320/59 X |
| 4,021,717 | 5/1977 | Furuishi et al. | 320/39 |
| 4,128,798 | 12/1978 | Takei | 320/59 X |
| 4,200,830 | 4/1980 | Oughton et al. | 320/32 |

*Primary Examiner*—Robert J. Hickey
*Attorney, Agent, or Firm*—Dann, Dorfman, Herrell & Skillman

[57] ABSTRACT

A method and apparatus for controlling a resonant power module comprising a resonant power circuit which is coupled to a load. First and second switching elements are coupled to the resonant circuit for alternately supplying a flow of current. Trigger generator means are provided for supplying trigger signals to alternately enable the first and second switching elements. A control means is coupled to the trigger generator for operating the power module in a first mode in which the resonant circuit current is controlled by varying the repetition rate of the trigger signals. The control means operates the power module in a second mode by maintaining the trigger signal repetition rate at a fixed limit and controlling the resonant circuit current by varying the on/off duty cycle of the power module.

12 Claims, 4 Drawing Figures

METHOD AND APPARATUS FOR CONTROLLING A RESONANT POWER MODULE

BACKGROUND OF THE INVENTION

This invention relates generally to power modules and, more particularly, to a method and apparatus for controlling the operation of a resonant power module such as a series resonant battery charging circuit for a series resonant power supply.

DESCRIPTION OF THE PRIOR ART

Many circuits have been developed for the purpose of charging batteries, and particularly for conveniently and efficiently transferring energy from an AC power source, such as utility power lines, to a battery. Battery charging circuits utilizing high performance switching devices such as, high speed thyristors (SCRs), which operate at switching frequencies exceeding 20 KHz, have become commonplace and a great deal of effort has been expended in devising appropriate control circuitry for such SCRs in order to efficiently control the charging rate for various types of batteries having different characteristics and initial states of charge.

One generally accepted way of controlling the charging current passed to the battery charging circuit is by employing one or more pairs of SCRs in a high speed series resonant converter circuit and by varying the point at which the SCRs are alternately gated on (conducting). By varying the time and/or frequency at which the SCRs are alternately gated, the average current delivered to the battery can be effectively controlled. One such technique for controlling the current delivered to the battery utilizing a pair of SCRs is disclosed in U.S. Pat. No. 4,200,830.

While high frequency battery chargers of the type disclosed in the aforementioned U.S. Pat. No. 4,200,830 have been generally satisfactory in performance, it has been observed that these chargers sometimes produce undesirable audio noise. More specifically, as the interval between successive current pulses increases (frequency or repetition rate of SCR gating decreases), for example, in order to operate the charge at greatly reduced output power near the end of the battery charging operation, a high frequency whine or scream is produced by the cyclical oscillation of the current through the charger circuitry. The scream, which is extremely annoying to anyone in the immediate vicinity of an operating charger, generally occurs as the apparent operating frequency of the charger falls below 20 KHz; generally the upper frequency limit of the audible range of the human ear. Experience has shown that conventional accoustic shields and filters are ineffective in eliminating the high frequency scream.

The present invention overcomes the problem presented by the prior art high frequency resonant chargers by providing a charger which avoids the production of high frequency audible noise by maintaining the apparent operating frequency within a frequency range which is above the audible range of the human ear. Further reductions in the output power of the charger are accomplished by sequentially turning the charger on and off at a substantially lower frequency in order to provide lower average current flows.

SUMMARY OF THE INVENTION

Briefly stated, the present invention provides a method and apparatus for controlling the operation of a power module, for example, a battery charger or a power supply, of the resonant type. The apparatus comprises a resonant power circuit for supplying current to a load which is coupled thereto. First and second switching elements are coupled to the resonant circuit for alternately supplying a flow of current. Trigger generator means are coupled to the switching elements for supplying trigger signals to alternately enable the first and second switching elements. A control means is coupled to the trigger generator for operating the power module in a first mode in which the resonant circuit current is controlled by varying the repetition rate of the trigger signals. The control means operates the charger in a second mode by maintaining the trigger signal repetition rate at a fixed level and controlling the resonant circuit current by varying the on/off duty cycle of the power module.

BRIEF DESCRIPTION OF THE DRAWINGS

The foregoing summary, as well as the following detailed description of a preferred embodiment of the invention will be better understood when read in conjunction with the appended drawings, in which.

DESCRIPTION OF A PREFERRED EMBODIMENT

Figure 1:
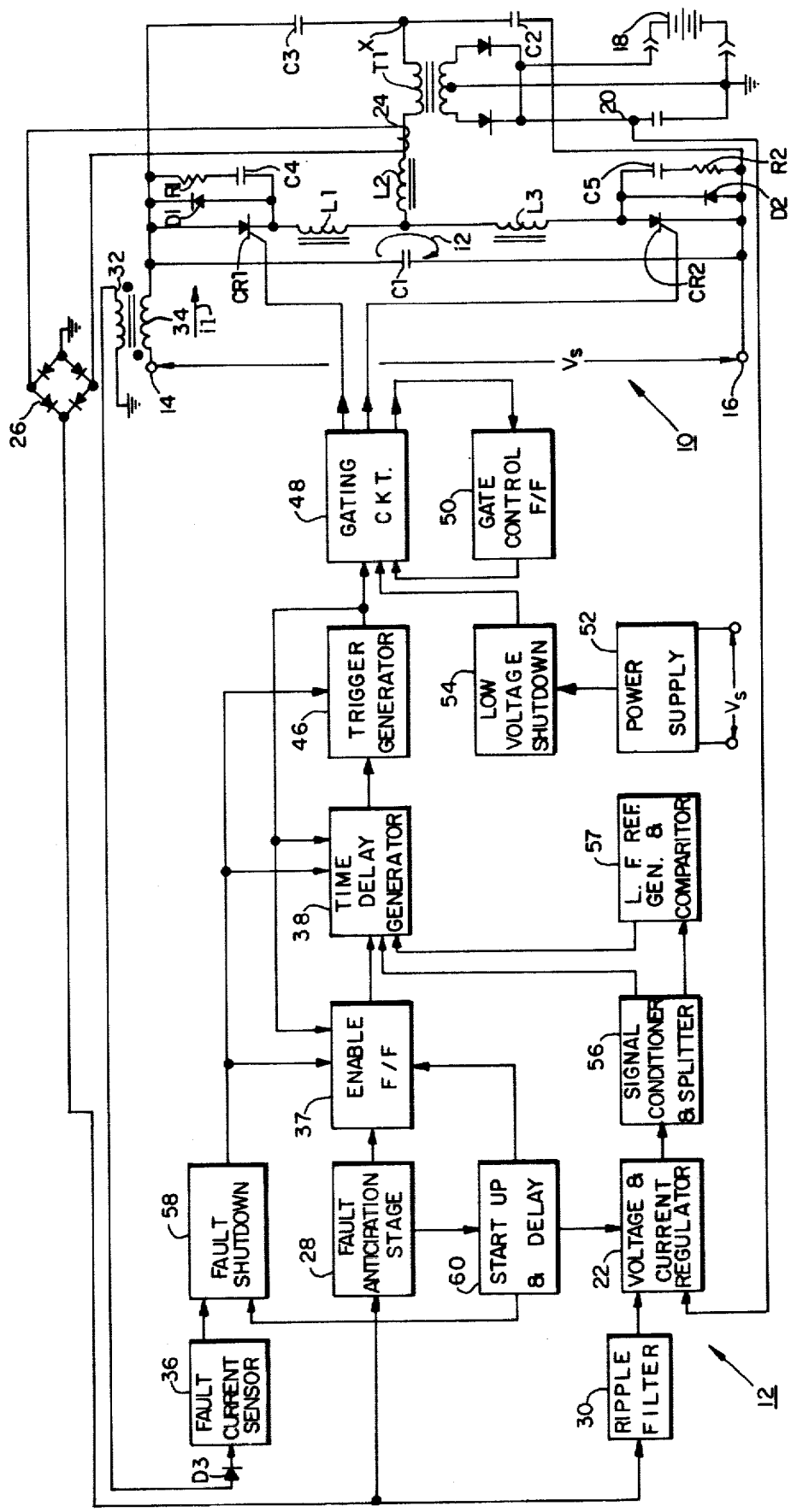
FIG. 1 is a schematic diagram of a high frequency charging circuit including a functional block diagram of the charger control circuitry.

According to FIG. 1, there is depicted a power module, for example a battery charger which comprises a series resonant power circuit shown generally as 10 and a control circuit shown generally as 12. It will be appreciated by those skilled in the art that the power circuit 10 could also be adapted to function as a series resonant power supply. A source of supply voltage $V_s$ is coupled through a rectification stage (not shown) across input terminals 14, 16 as indicated for supplying power to the power circuit 10. In a typical application, the power will be supplied from a rectification stage, such as a bridge circuit, coupled to an AC power source, for example utility power lines. In a preferred application, three-phase power is utilized, although two-phase and single-phase power may also be used if convenient. The power circuit 10 is one which is generally termed a series resonant converter, and is of a type well known to those skilled in the art. One example of such a circuit is shown and described in detail in U.S. Pat. No. 4,200,830 and which is incorporated herein by reference.

Basically, the power circuit 10 employs a pair of switching elements, for example a pair of thyristors, such as SCR's CR1 and CR2, which are alternately gated or enabled to maintain current oscillations in a resonant circuit. In the illustrated embodiment, for example, CR1 may first be gated by an appropriate gating signal to cause current to flow through a pair of inductors L1 and L2, then through the primary winding of a transformer T1 to charge a pair of capacitors C2 and C3. Ultimately, the voltage on capacitors C2 and C3 will build up to a value adequate to support a "ringback", or resonant reversal, of the system current. The series combination of inductors L1 and L2 and capacitors C2 and C3 resonate in a manner commonly understood and encourage a current reversal which flows through a diode D1. The reversed current also back-biases thyristor CR1, causing it to commutate or cease conducting current. The current oscillates about the circuit to charge capacitors C3 and C2. The series combination of a resistor R1 and a capacitor C4 is used along with inducators L1 and L3 as a snubber to limit the rate of rise of voltage across thyristor CR1.

Subsequent to the commutation of the first thyristor CR1, a second gating signal is applied to the gate terminal of the second thyristor CR2. Assuming that this gating signal occurs during the "ringback" or resonant current reversal just described, current is diverted away from inductor L1 and caused to flow through inductor L3. At the same time, current is drawn from capacitors C3 and C2, causing the voltages across the latter to increase and decrease respectively. By gating the second thyristor during the "ringback" current pulse, the circuit effectively takes advantage of the elevated current already flowing through the resonant circuit. By adjusting exactly when the second thyristor is gated, subsequent to a minimum time to insure that the first thyristor has commutated, the current in the resonant circuit can be controlled.

Eventually, the circuit including capacitors C2 and C3, the primary winding of transformer T1, and inductors L2, and L3 gives rise to another ringback current reversal. This second current reversal again charges capacitors C2 and C3 through a circuit loop which includes diode D2. At the same time, the second current reversal back-biases, and therefore commutates, thyristor CR2. As with the first thyristor, a snubber circuit including a resistor R2 in series with a capacitor C5 is provided and acts in conjunction with inductors L1 and L3 to limit the rate of voltage rise across thyristor CR2.

By continuing to alternately gate thyristors CR1 and CR2, it will be understood that a flow of alternating current can be maintained through the primary winding of transformer T1. By varying the frequency at which the thyristors are gated or triggered, the average value of the resonant current can be controlled and accordingly, a greater or lesser amount of outside current can be delivered to the circuit.

For example, when a fully discharged battery is first connected to the charger, it is desirable to provide a relatively high current value within the resonant circuit in order to rapidly recharge the battery. By alternately triggering the thyristors CR1 and CR2 at a high frequency, a high current level can be maintained. As the battery charges up, the amount of current flowing through the resonant circuit and thus the frequency of the thyristor triggering is decreased. As was described above, if the frequency of the thyristor triggering falls within the human audible range (below 20 KHz), for example due to a low current demand as the battery is nearly fully charged, an undesirable high frequency whine or scream results. Therefore, the present invention operates in two modes to control the resonant circuit current. In the first mode, involving triggering frequencies above 20 KHz, the frequency or repetition rate of the thyristor triggering signals is varied between a maximum frequency and a minimum frequency of 20 KHz to control the resonant circuit current in the usual manner. However, once the current in the resonant circuit reaches a level which requires a thyristor triggering frequency of 20 KHz, further decreases in the resonant circuit current are obtained by operating in a second mode in which the thyristor triggering frequency is maintained at the minimum 20 KHz level and the on/off duty cycle of the charger is varied at a substantially lower frequency, for example 60 Hz, which is more acceptable to the human ear. In this second mode of operation, the time average current may be further decreased by decreasing the time of the 20 KHz resonant circuit current "bursts".

Energy is transferred from the oscillating circuit to the battery circuit by a current transformer T1. Current from the transformer, herein depicted as a center-tapped transformer with full-wave rectification, is applied to a battery 18 which is coupled to the power circuit 10 by suitable connectors. The battery voltage at any given time can be monitored at point 20 in the battery circuit. Point 20 is coupled to a voltage and current regulator stage 22 of the control system 12. The instantaneous magnitude of the resonant current flowing in the charger power circuit is also sensed by means of a current transformer or similar pickup winding 24. The current signal from the pickup winding 24 is rectified, for example, by means of a bridge rectifier 26, and is applied to a fault anticipation stage 28 in the control circuit 12. The current signal from the pickup winding 24 is also applied to the voltage and current regulator stage 22 through a ripple filter 30.

Another input to the control circuit is supplied by means of a sensing winding 32 coupled to an inductor 34. The signal thereby sensed represents current flow from the voltage source $V_s$ into the battery charger power circuit 10. The current signal is applied through a rectifier such as a diode D3 to a fault current sensor 36. The inductor 34 also serves to prevent a fault (sudden inrush or surge of current) in the event that both thyristors CR1 and CR2 are simultaneously conducting, for example, due to one of the thyristors failing to commutate. The aforementioned U.S. Pat. No. 4,200,830 describes in detail the functioning of the inductor 34 in preventing an undesirable current surge through the power circuit 10.

Turning now to the control circuit 12, the fault anticipation stage 28 receives the current signal from the pickup winding 24 and generates an output signal or firing signal only if it determines from the received current signal that a "ringback" current pulses of sufficient amplitude to commutate the conducting thyristor will flow. Complete details of the structure and operation of the fault anticipation stage 28 are set forth in the aforementioned U.S. Pat. No. 4,200,830 to which reference is made. Complete disclosure herein is not necessary in order to provide a complete understanding of the present invention.

The output firing signal from the fault anticipation stage 28 is received by an enable flip flop 37. The output of the enable flip flop 37 is processed by a time delay generator 38 and a properly timed firing signal is transmitted to a trigger signal generator 46. The generated trigger signal from the trigger generator 46 then serves to operate a gating circuit 48, which alternately gates thyristors CR1 and CR2 in accordance with the state of a gate control flip flop 50. A local power supply 52, advantageously operated from the supply voltage $V_s$, supplies the necessary bias voltage Vcc to the various elements of the control circuit. The local power supply 52 is monitored by a low voltage shutdown circuit 54 which operates to inhibit the operation of the gating circuit 48 in the event that local power is lost or becomes too low for proper control circuit operation. Specific details of the structure and operation of the gating circuit 48, the gate control flip flop 50, the local power supply 52 and the low voltage shutdown circuit 54 are set forth in the aforementioned U.S. Pat. No. 4,200,830 and will not be presented herein since they are not necessary for a complete understanding of the present invention.

The relative timing of the trigger signal generated by the trigger generator 46 is determined in part by a signal conditioned and splitter stage 56 in conjunction with a low frequency reference generator and comparator stage 57. Signals from both of these stages are transmitted to the time delay generator 38 in order to speed up or delay the production of trigger signals as well as to control the on/off duty cycle of the trigger generator 46, thus varying the ultimate rate at which current is introduced into the resonant power circuit through the thyristors CR1 and CR2. The voltage and current regulator stage 22 outputs a signal which governs the signal conditioner and splitter stage 56 so that the resulting signals transmitted to the time delay generator 38 are modified as a function of the existing battery voltage and the resonant power circuit current level. A detailed description of the specific structure and operation of a voltage and current regulator substantially the same as voltage and current regulator 22 is presented in the aforementioned U.S. Pat. No. 4,200,830 to which reference is made. Complete disclosure herein is not necessary for a complete understanding of the present invention.

A fault shutdown stage 58 is responsive to a signal from the fault current sensor 36 to reset the enable flip flop 37 and to inhibit the trigger signal generator 46 in the event of a power circuit failure of a type which tends to draw excessive current. Finally, a time delay means, identified as a startup and delay stage 60 is provided to the control system. The startup and delay stage 60 actually performs two functions. First, it introduces a restart firing signal to the enable flip flop 37 and to the fault shutdown stage 58 at some fixed time, for example, five seconds, subsequent to the sensing of a thyristor commutation failure by the fault current sensor 36. Secondly, it functions to initialize, i.e., energize in the proper sequence, the various elements of the control circuit 12 so that upon start or restart of the system all elements function properly. Complete details of the structure and operation of the fault shutdown stage 58 can be found in the aforementioned U.S. Pat. No. 4,200,830 to which reference is made and will not be presented herein since they are not necessary for a complete understanding of the present invention.

Figure 2:
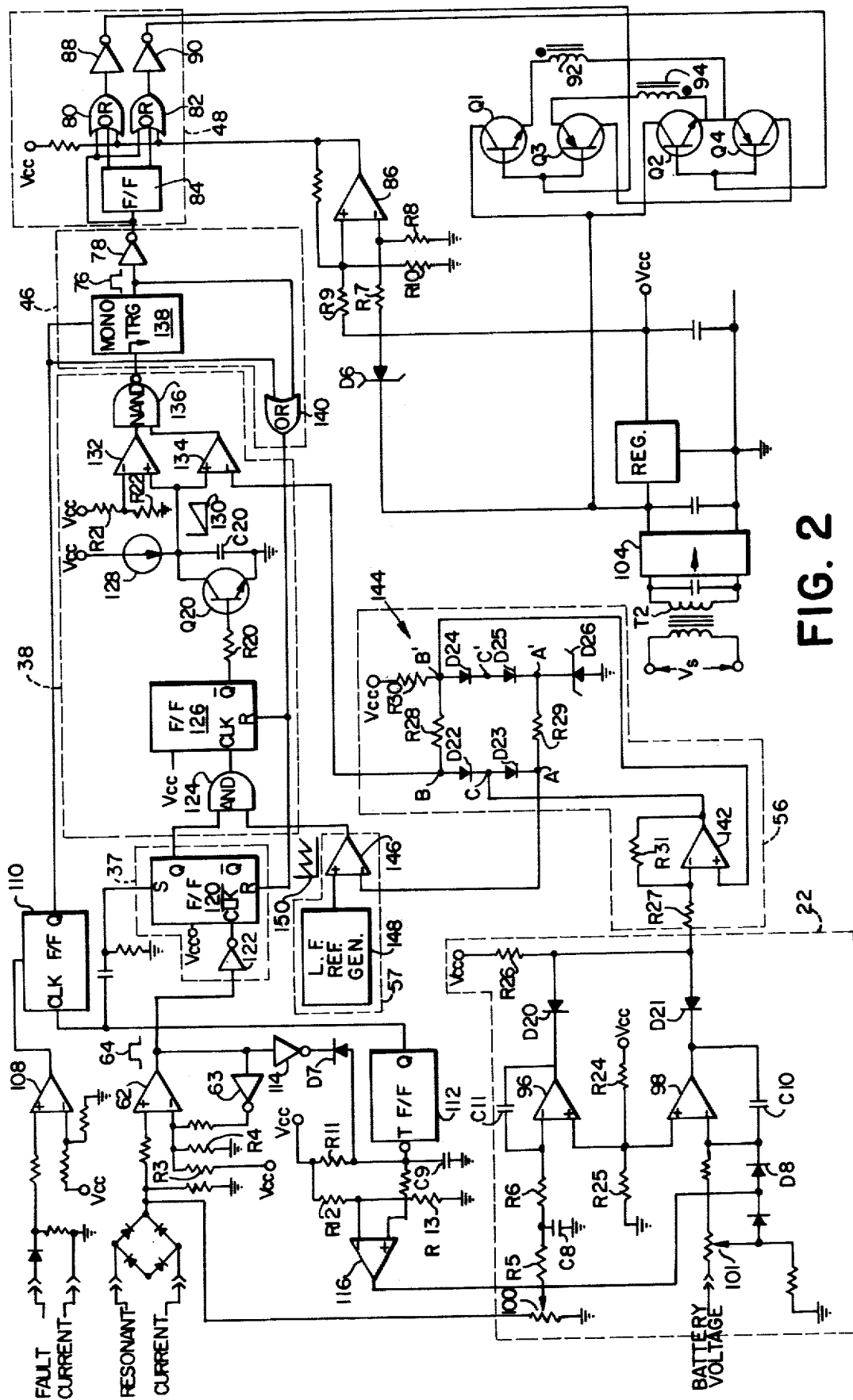
FIG. 2 is a schematic circuitry diagram of the control circuitry of FIG. 1.

Referring now to FIG. 2, there is shown a detailed illustration of a preferred embodiment of the control circuit 12. The enable flip flop 37 comprises generally a D-type flip flop 120 of a type which is generally well known in the art. The output of the fault anticipation stage 28 taken from the output of comparator 62 is connected through a suitable inverter 122 to the clock (CLK) input of the enable flip flop 120. If the fault anticipation stage 28 determines that the "ringback" current resulting from the existing main current pulse will be sufficient to commutate the conducting thyristor, a firing signal, in the form of a positive pulse 64 is transmitted (in inverted form) to the CLK input of the flip flop 120. As is described in detail in the aforementioned U.S. Pat. No. 4,200,830, the firing signal is initiated and thus enable flip flop 120 is toggled, at the current null point of the preceding main current pulse.

The Q output of enable flip flop 120 is connected to a two input AND gate 124, the output of which is in turn connected to the CLK input of a ramp flip flop 126. The other input to the AND gate 124 is connected to the low frequency generator and comparator 57 for purposes which will hereinafter be discussed in further detail.

The $\overline{Q}$ output of ramp flip flop 126 is connected through resistor R20 to the base of a transistor Q20. The emitter of transistor Q20 is tied to ground and a capacitor C20 is connected between the collector of the transistor Q20 and ground. A constant current generator 128 of any suitable known type is connected to provide a constant flow of current to the collector of transistor Q20 and to capacitor C20.

Transistor Q20, capacitor C20 and constant current generator 128 operate in conjunction with ramp flip flop 126 to generate a positive going ramp signal 130 which is synchronized with the null point of the preceding main current pulse in the resonant circuit. When the transistor Q20 is in a non-conducting state (turned off), the constant current applied to the ungrounded plate of capacitor C20 causes it to charge up in the conventional linear manner. The application of a signal from AND gate 124 to the CLK input of ramp flip flop 126 causes the flip flop to toggle, thereby outputting a negative level on its $\overline{Q}$ output terminal. The application of the negative $\overline{Q}$ output level to the base of transistor Q20 causes the transistor to turn off, thereby charging the capacitor C20 to generate a positive going ramp signal 130. Subsequently, when the ramp flip flop 126 is reset, the transistor Q20 is turned on and the capacitor C20 discharges. Thus, the charging of the capacitor C20 and therefore the beginning of each ramp signal occurs just after the transmission of a firing signal 64 from the fault anticipation stage 28 at the null point of the previous main current pulse in the resonant circuit.

The collector of transistor Q20 is also connected to the positive inputs of a pair of comparators 132 and 134. The two comparators 132 and 134 cooperate to establish the delay time between the null point of the previous resonant circuit main current pulse and the gating of the alternate thyristor which initiates the next main current pulse. The negative input of comparator 132 is connected to a voltage divider comprising R21 and R22 and the biasing voltage, Vcc. In this manner, comparator 132 provides a positive output only when the ramp signal 130 becomes greater than the positive reference voltage level established by the voltage divider. The purpose of the first comparator 132 is thus to provide a fixed minimum delay in time between the beginning of the ramp signal 130 and the earliest possible gating of the non-conducting thyristor.

The negative input of the second comparator 134 is connected to the signal conditioner and splitter circuitry 56 which provides a variable voltage level in a manner which will hereinafter be described. Comparator 134 provides a positive output signal only when the ramp signal 130 is greater than the variable voltage level provided by the signal conditioner and splitter 56.

The outputs of both comparators 132 and 134 are connected together and, through a NAND gate 136, are connected to the input of a monostable flip flop or one shot 138. No signal is transmitted through the NAND gate 136 to the one shot 138 until the ramp signal 130 exceeds both the minimum voltage level established by the voltage divider and the voltage level applied to the negative input of comparator 134, thereby making the outputs of both of the comparators 132 and 134 positive at the same time.

The one shot 138 is of the type well known in the art which provides a positive fixed time output trigger signal 76 upon receiving a negative going input. The fixed duration trigger signal 76 is received by the gating circuit 48 which alternately gates thyristors CR1 and CR2 in accordance with the state of the gate control flip flop 50 in the manner as described in detail in the aforementioned U.S. Pat. No. 4,200,830 to which reference is made for a fuller understanding.

The output of the one shot 138 is also connected to one input of a two input OR gate 140. The second input of OR gate 140 is connected to the output of the fault shutdown stage 58. The output of OR gate 140 is connected to the reset input of both the enable flip flop 120 and the ramp flip flop 126. Thus, both flip flops 120 and 126 are reset either upon the occurrence of a fault current condition or the occurrence of a trigger signal 76.

The set input S of the enable flip flop 120 is also connected through a suitable capacitor to the output of the startup and delay stage 60 for the purpose of initializing the enable flip flop 120 and the circuitry connected thereto in the event a commutation fault shuts down the charger. The startup and delay stage 60 is comprised of a retriggerable multivibrator 112, the timing of which is controlled by an RC timing circuit comprised of a resistor R11 in combination with grounded capacitor C9. When comparator 62 outputs a firing signal 64, the capacitor C9 is discharged to reset the timing cycle of the RC circuit. In the event of the shutdown of the charger circuit by the fault anticipation stage 28, the RC timing circuit is allowed to complete its timing cycle. Upon the completion of the RC timing cycle, the Q output of the multivibrator 112 outputs a positive pulse which is transmitted to the CLK input of flip flop 110 to initialize the fault shutdown stage 58. The Q output of the multivibrator 112 is also fed to the S input of the enable flip flop 120 to restart the charger. Further details of the remainder of the startup and delay stage 60 can be found in the aforementioned U.S. Pat. No. 4,200,830.

The relative timing of the trigger signal 76 is determined in part by the signal conditioner and splitter circuitry 56 in conjunction with the voltage and current regulator 22. The rectified current signal from the pickup winding 24 is applied through a calibrating potentiometer 100, and by way of a ripple filter 30, comprised of resistors R5 and R6 and a capacitor C8, to the negative input of a current regulating amplifier 96. A feedback capacitor C11 couples the output of amplifier 96 with its negative input. The positive input of amplifier 96 is coupled to a reference potential established by the biasing voltage Vcc and a suitable voltage divider comprised of R24 and R25.

The battery voltage signal from point 20 is received at the negative input of an amplifier 98, through a resistive network including a calibrated potentiometer 101. An output signal from the startup and delay circuit is also applied to the negative input of amplifier 98 through a diode D8. A feedback capacitor C11 couples the negative input of amplifier 98 with its output. The reference potential applied to the positive input of amplifier 96 is also applied to the positive input of amplifier 98.

The outputs of amplifiers 96 and 98 are coupled respectively to diodes D20 and D21, both of which are connected together and forward biased by a reference voltage established by biasing voltage Vcc through a resistor R26.

In effect, the output of amplifier 96 represents the maximum current which may be delivered to the battery by the power circuit 10. The output of amplifier 98 represents the current which could be accepted by the battery based upon the existing battery voltage. The signal transmitted out of the voltage and current regulator 22 represents the minimum of the current demanded by amplifier 96 and its associated circuitry or by amplifier 98 and its associated circuitry and thus is representative of the minimum of the current demanded by the battery and the maximum resonant circuit current.

Thus, for example, during the initial period of charging a nearly completely discharged battery, current demand of the battery and thus the output of amplifier 98 is high due to the low voltage level of the battery and thus the minimum current demanded is determined by the maximum resonant circuit current level established by the output of amplifier 96. As the battery becomes nearly fully charged, the higher battery voltage causes lower current demand and thus the output of amplifier 98 to be lower than the maximum resonant circuit current level established by output of amplifier 96 and thus the minimum current demanded is that of amplifier 98.

The minimum current level of amplifiers 96 and 98 is transmitted through a resistor R27 to the negative input of an inverting scaling amplifier 142. The amplifier 142 inverts the signal from the voltage and current regulator 22 and scales it to a usable range based upon a reference voltage applied to the positive input of the amplifier 142 and the ratio of the resistors R27 and R31.

The output of amplifier 142 is connected at a point designated as C between a pair of diodes D22 and D23 connected in series and forming part of a splitter circuit shown generally as 144. The splitter circuit also comprises series connected diodes D24 and D25 and zener diode D26. A resistor R28 connects the anode of diode D22 (point B) to the anode of diode D24 (point B'). In a similar manner, the cathode of diode D23 (point A) is connected by a resistor R29 to the cathodes of diodes D25 and D26 (point A'). Biasing for the splitter 144 is provided by biasing voltage Vcc through a suitable resistor R30. As shown, the reference voltage at point B' is fed back to the positive input of amplifier 142 in order to provide the requisite voltage scaling reference.

The splitter 144 determines the reference voltage levels at points A and B which are used to control the trigger signal 76. The reference voltage level at point A is employed to control the on/off duty cycle of the trigger generator 46 and the reference voltage at point B is employed to control the repetition rate of the trigger signals 76. The voltage level at points A and B are varied within limits set by the relatively fixed reference voltages at points A' and B' by the changes in the voltage at point C, the scaled output voltage of amplifier 142. For example, if the voltage level at point C rises (above its quiescent valve as established by the reference voltage at point C') due, to a decrease in the current demand by the battery (i.e., as the battery is nearly fully charged), the voltage level at point A correspondingly increases (less the drop of diode D23), while the voltage level at point B remains essentially constant at the reference voltage level of B'. Alternatively, if the voltage level at point C falls due, for example, to an increase in the current demand of the battery up to the maximum resonant circuit current (i.e., during the initial charging period of an uncharged battery), the voltage level at point B correspondingly decreases while the voltage level at point A remains essentially constant at the reference level of A'.

Figure 4:
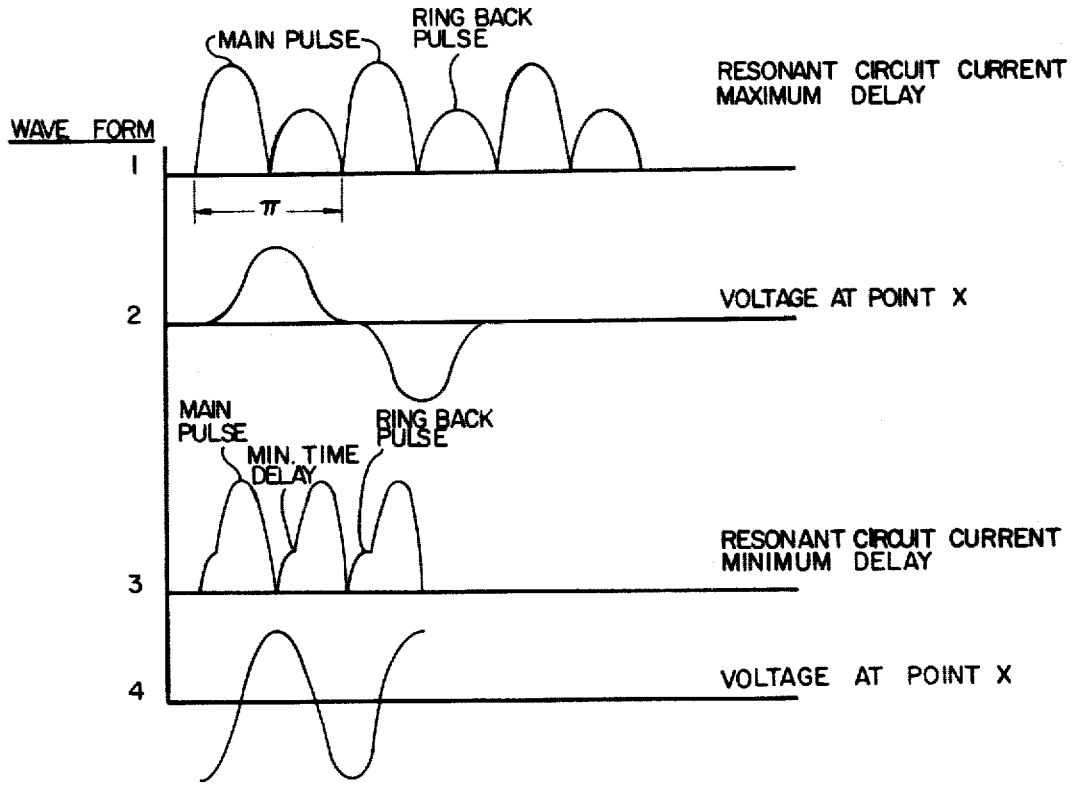
FIG. 4 is a timing diagram containing representative wave forms as generated in conjunction with the operation of the circuitry of FIG. 1.

As shown, point B is connected to the negative input of comparator 134. Thus, comparator 134 compares the ramp signal 130 with the reference voltage level at point B and provides a positive output only when the ramp signal voltage is greater than the reference voltage level at point B. The timing of the trigger signal 76 is thus determined by the reference voltage level at point B in conjunction with the ramp signal 130 and the minimum ramp voltage level established by voltage diode resistors R21 and R22. If the voltage reference level at point B is low, the trigger signal occurs just after the ramp signal reaches the established minimum level so the trigger signal occurs just slightly after the null current point of the previous main current pulse (see waveform 3 of FIG. 4). As the reference voltage level at point B increases (up to the reference level of point B'), the occurrence of the trigger signal is shifted in time away from the null current point of the previous main current pulse (see waveform 1 of FIG. 4). In this manner, the frequency or repetition rate of the trigger signal 76 is varied to control the resonant circuit current.

Point A is connected to the negative input of a comparator 146. The positive input of comparator 146 is connected to the output of a low frequency reference generator 148. The low frequency reference generator 148 produces a low frequency wave form, for example the modified sawtooth waveform 150 as shown, which is employed for low frequency modulation of the charger in order to vary the charger on/off duty cycle. By varying the on/off duty cycle of the charger, the time average current delivered to the battery can be reduced to a lower level while still maintaining the frequency or repetition rate of the gating of the thyristors at a level above the human audible range.

The waveform produced by the low frequency reference generator 148 could comprise many different shapes and forms other than the modified sawtooth waveform 150 as shown. The low frequency waveform could be conveniently linked to the input line voltage of the charger. For example, a rectified 60 Hz sinusoidal waveform could be produced using suitable techniques which are known in the art. Alternatively, a suitable low frequency sawtooth waveform could be generated from a standard three-phase A.C. utility line voltage using suitable circuitry which is known in the art. It should be understood, therefore, that the present invention is not limited to the specific low frequency sawtooth waveform shown or to the specific generating circuitry therefor.

Figure 3:
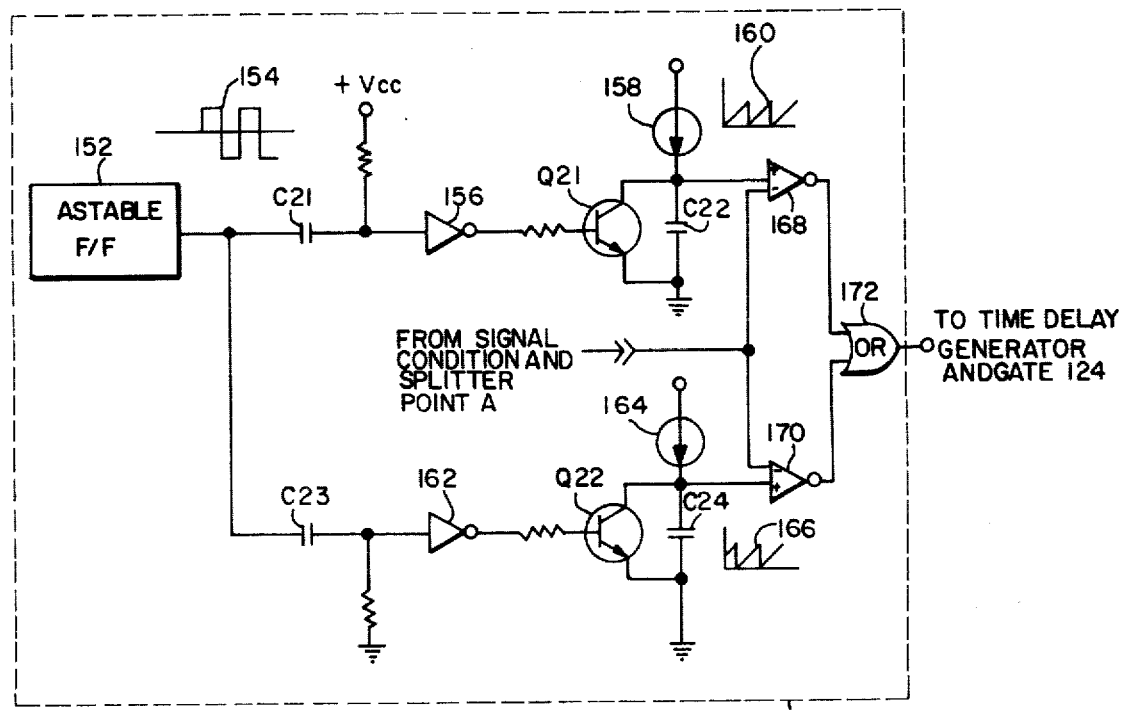
FIG. 3 is a more detailed schematic diagram of a portion of the circuitry diagram of FIG. 2.

FIG. 3 shows one embodiment of a circuit for generating the low frequency sawtooth waveform 150 utilizing the readily available D.C. biasing voltage Vcc. A suitable biased astable multivibrator (flip flop) 152 constantly generates a suitable square wave 154 at a suitable low frequency, for example 60 Hz. The output of the astable flip flop 152 is suitably coupled through a capacitor C21 and an inverter 156 to the base of a transistor Q21. The transistor Q21 operates in conjunction with capacitor C22 and a constant current generator 158 to produce a ramp waveform 160. Similarly, the output of the astable flip flop 152 is also coupled, through capacitor C23 and inverter 162, to the base of a transistor Q22.

The transistor Q22 also operates in conjunction with capacitor C24 and a constant current generator 164 to produce a ramp waveform 166. Ramp waveforms 160 and 166 are 180° out of phase so that when combined through comparators 168 and 170 and OR gate 172 as shown, the output to the AND gate 124 will behave the same as if the waveform 150 was applied to a single comparator 146 as shown in FIG. 2. As shown, the waveform 150 appears to be a sawtooth riding on a fixed D.C. voltage level.

Referring again to FIG. 2, the modified sawtooth waveform 150 is applied to the positive input of comparator 146. The output of comparator 146 is connected to the second input of AND gate 124. As long as the reference voltage level at point A remains less than the instantaneous voltage level of waveform 150, the output of comparator 146 remains high, thereby enabling AND gate 124 to pass an output from the enable flip flop 120 to toggle the ramp flip flop 126. For example, as long as the reference voltage level at point A remains within the continuous D.C. voltage level area of the wave form 150, the control circuit 12 operates in the first mode in which the charger is constantly on and the resonant circuit current is controlled by varying the repetition rate of the triggering signals 76. As the voltage level at point A increases above the constant D.C. area of waveform 150 (for example, due to a decrease in the current demand of the battery), the output of comparator 146 cycles from high to low, depending upon the instantaneous valve of the waveform voltage. For example, in the waveform peak areas where the instantaneous waveform voltage exceeds the point A reference voltage level, the comparator 146 output is high. Correspondingly in the valleys between the waveform peaks where the instantaneous waveform voltage is less than the reference voltage level of point A, the output of the comparator 146 is low. As long as the voltage level at point A remains above the continuous D.C. level area of waveform 150, the control circuit operates in the second mode in which the on/off duty cycle of the charger is varied to control the current in the resonant circuit. It is readily apparent that as the reference voltage level of point A rises higher relative to the wave form 150, the periods of time in which the output of the comparator 146 is high will become shorter relative to the periods of time in which the output of the comparator 146 is low and vice versa.

If a rectified 60 Hz sinusoidal waveform were employed instead of waveform 150, the resulting duty cycle variations would be similar. However, if the 60 Hz waveform was not suitably filtered, the inevitably valleys in the waveform below the reference level of point A would cycle the charger off for short periods of time even during operation in the first mode. In this manner, if the 60 Hz line voltage providing power to the charger falls below a level acceptable for reliable charger operation, the charger is temporarily turned off until such time as the line voltage is again adequate.

Whenever the output of comparator 146 is low, AND gate 124 is disabled, thereby in effect turning off the charger, by preventing the generation of the trigger signal 76. Since no trigger signals 76 are generated, the thyristors CR1 and CR2 are not gated and no current can flow to the battery 18. Thus, when the control circuit operates in the second mode, the time average current flowing to the battery is controlled by employing waveform 150 as a reference in conjunction with the battery current demand as established by the voltage level at point A to cycle the charger on and off.

In operation of the charger, when a discharged battery is initially charged, the charger operates in the first mode. The voltage and current regulator 22 determines that the maximum reasonant circuit current should be employed and the voltage level at point C is low, thereby pulling the reference voltage level at point B down. The voltage reference level at point A remains constant, thereby enabling AND gate 124 to keep the charger on continuously. A low voltage reference level at point B results in the minimum ramp signal 130 controlling the timing of the trigger signal 76, thus providing maximum current as shown in waveform 3 of FIG. 4. As the battery charges up, less current is needed in the resonant circuit and the voltage level at point C increases. An increase in the voltage level at point C causes the reference voltage at point B to increase thereby increasing the delay time between trigger signals as shown in waveform 1 of FIG. 4. As the reference voltage at point B reaches the level established by B', further increases in the voltage at point C do not result in further increases in the voltage level at point B. The reference voltage level at B' is thus selected to provide the minimum trigger signal repetition rate of 20 KHz. Further increases in the voltage at point C causes the reference voltage at point A to rise, thereby operating the charger in the second mode in which the on/off duty cycle of the changer is varied by the modulation of the enable time of AND gate 124 in conjunction with the output waveform of the low frequency reference generator 148.

From the foregoing description it can be seen that the present invention provides a method and apparatus for efficiently controlling a series resonant battery charger. It will be recognized by those skilled in the art, that changes or modifications may be made to the above-described embodiment without departing from the broad inventive concepts of the invention. For example, the same concepts and circuits could be employed in a series resonant power supply. It is understood, therefore, that this invention is not limited to the particular embodiment described, but it is intended to cover all changes and modifications which are within the scope and spirit of the invention as defined in the appended claims.

I claim:

1. A power module of the resonant type comprising:
   a resonant power circuit for supplying current to a load;
   first and second switching elements coupled to the resonant circuit for alternately supplying current to the resonant circuit;
   trigger generator means coupled to the switching elements for supplying trigger signals to alternately enable the first and second switching elements; and
   control means coupled to the trigger generator means for operating the power module in a first mode wherein the resonant circuit current is controlled by varying the repetition rate of the trigger signals and in a second mode wherein the trigger signal repetition rate is fixed and the resonant circuit current is controlled by varying the on/off duty cycle of the power module.

2. The power module as recited in claim 1 wherein the fixed trigger signal repetition rate is established as a lower repetition rate limit.

3. The power module as recited in claim 2 wherein the on/off duty cycle of the power module is established by modulating the trigger generator means with a low frequency waveform.

4. The power module as recited in claim 3 wherein the low frequency waveform is comprised of a modified sawtooth formed by the sum of a ramp waveform and a D.C. voltage.

5. The power module as recited in claim 2 wherein the power module is a battery charger and the load is a battery.

6. The battery charger as recited in claim 5 further including voltage sensing means for sensing the magnitude of the battery voltage wherein in the first mode of charger operation, the trigger signal repetition rate is increased in response to a sensed decrease in the battery voltage and the trigger signal repetition rate is decreased to the lower repetition rate limit in response to a sensed increased in the battery voltage.

7. The battery charger as recited in claim 6 wherein the charger operates in the second mode whenever the trigger signal repetition rate reaches the lower repetition rate limit and a further increase in the battery voltage is sensed.

8. The battery charger as recited in claim 7 wherein the lower trigger signal repetition rate limit is established at a frequency of 20 KHz.

9. The battery charger as recited in claim 8 wherein the on/off duty cycle of the charger is established by modulating the trigger generator means with a low frequency waveform.

10. The battery charger as recited in claim 9 wherein the low frequency waveform is comprised of a modified sawtooth formed by the sum of a waveform and a D.C. voltage.

11. A method of controlling the current delivered to a load by a power module of the resonant type in which a pair of switching elements are alternately enabled by trigger signals to supply current to the resonant circuit comprising:
   varying the repetitive rate of the switching element trigger signals to control the current in the resonant circuit above a predetermined current level; and
   maintaining the switching element trigger repetition rate at the rate established by the predetermined current level and varying the on/off duty cycle of the power module to control the current in the resonant circuit at or below the predetermined current level.

12. The method as set forth in claim 11 wherein the power module is a battery charger and the load is a battery.

* * * * *